US010575508B2

(12) United States Patent
Niitsuma

(10) Patent No.: US 10,575,508 B2
(45) Date of Patent: Mar. 3, 2020

(54) BRAKING APPARATUS FOR DUAL-BEARING REEL

(71) Applicant: Shimano Inc., Sakai, Osaka (JP)

(72) Inventor: Akira Niitsuma, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 16/216,514

(22) Filed: Dec. 11, 2018

(65) Prior Publication Data

US 2019/0223421 A1    Jul. 25, 2019

(30) Foreign Application Priority Data

Jan. 23, 2018  (JP) .................................. 2018-008525

(51) Int. Cl.
*A01K 89/0155* (2006.01)
*A01K 89/015* (2006.01)

(52) U.S. Cl.
CPC .... *A01K 89/01555* (2013.01); *A01K 89/0192* (2015.05); *A01K 89/01931* (2015.05)

(58) Field of Classification Search
CPC ...................... A01K 89/0155; A01K 89/01556
See application file for complete search history.

(56) References Cited

U.S. PATENT DOCUMENTS

| 2004/0148843 A1* | 8/2004 | Ikuta ................. A01K 89/01555 43/21 |
| 2013/0233957 A1* | 9/2013 | Niitsuma ............. A01K 89/015 242/285 |
| 2014/0110516 A1* | 4/2014 | Niitsuma ......... A01K 89/01555 242/288 |
| 2014/0110517 A1* | 4/2014 | Niitsuma ......... A01K 89/01555 242/288 |

FOREIGN PATENT DOCUMENTS

| JP | 4039951 B2 | 11/2007 |
| JP | 5122273 B2 | 11/2012 |

\* cited by examiner

*Primary Examiner* — Emmanuel M Marcelo
(74) *Attorney, Agent, or Firm* — Global IP Counselors, LLP

(57) ABSTRACT

A braking device for a spool that is rotatably supported by a reel body includes a spool braking device, a rotational speed detector, and an electronic controller. The spool braking device is configured to brake a spool in an electrically controllable manner. The rotational speed detector is configured to detect a rotational speed of the spool. The electronic controller is configured to control the spool braking device to brake the spool with a first braking force for a first predetermined period of time, and control the spool braking device to brake the spool with a second braking force that is based on a change in the rotational speed after the first predetermined period of time has elapsed.

5 Claims, 10 Drawing Sheets

|  | | OPERATION MODE | | |
|---|---|---|---|---|
|  | | FL | PE | NM |
| ESTIMATED TENSION VALUE | R1 | f1 | f2 | f3 |
|  | R2 | f4 | f5 | f6 |
|  | R3 | f7 | f8 | f9 |

FIG. 6

BRAKING APPARATUS FOR DUAL-BEARING REEL

CROSS-REFERENCE TO RELATED APPLICATIONS

This application claims priority to Japanese Patent Application No. 2018-008525, filed on Jan. 23, 2018. The entire disclosure of Japanese Patent Application No. 2018-008525 is hereby incorporated herein by reference.

BACKGROUND

Field of the Invention

The present invention relates to a braking apparatus for a dual-bearing reel for braking a spool that is rotatably supported by a reel body.

Background Art

In a fishing reel, in which a spool, around which a fishing line is wound, rotates when the fishing line is cast (unreeled), there are situations in which backlash occurs, which is when the rotational speed of the spool is faster than a line delivery speed during casting. When the backlash occurs, the fishing line becomes slack, so that the fishing line sags, causing the fishing line to become tangled. Thus, a dual-bearing reel, particularly a bait casting reel for casting a lure attached to a distal end of the fishing line, generally includes a braking apparatus that brakes the spool in order to prevent backlash at the time of casting.

In the braking apparatus for a dual-bearing reel disclosed in Japanese Patent No. 4039951, when tension detected by a tension detection device is less than or equal to a first predetermined value that is smaller than the initial tension at the time of casting, the spool is braked with a first braking force, which changes in accordance with the initial rotational speed of the spool at the time of casting, during a first predetermined period of time. The braking apparatus brakes the spool with a second braking force, which is weaker than the first braking force, during a second predetermined period of time after the first predetermined period of time has elapsed.

The braking apparatus for a dual-bearing reel disclosed in Japanese Patent No. 5122273 controls a spool braking device such that the spool is braked with the first braking force. Thereafter, when a tension that is detected by the tension detection device is less than or equal to a reference tension, the braking apparatus controls the spool braking device such that the spool is braked by the second braking force, which augments the first braking force.

When a spool is braked with a braking force in accordance with the rotational speed of the spool as in the braking apparatus for a dual-bearing reel disclosed in Japanese Patent No. 4039951, there are situations in which, depending on the amount of fishing line, there is excessive or deficient braking of the spool. When the spool is braked with the second braking force, which is greater than the first braking force, when a reduction in the tension is detected, as in the braking apparatus for a dual-bearing reel disclosed in Japanese Patent No. 5122273, there are situations in which the spool is braked excessively, since the spool is braked with a stronger braking force during the latter half of the casting. If the braking for preventing backlash becomes excessive, the flight distance can be reduced. In addition, in the situation where casting is carried out following replacement of various types of lures or spools around which fishing lines of various thicknesses and materials are wound, various parameters change, such as air resistance and flight attitude of the lure during flight, the air resistance of the fishing line, rotational resistance of the spool to casting control, etc., and, in the situation in which a boat is used, such parameters as tailwind and headwind may readily change, so that there are cases in which braking control cannot keep pace with such changing conditions, resulting in excessive or deficient braking of the spool.

SUMMARY

In view of the circumstances described above, an object of the present invention is to improve the precision of the braking of the spool while suppressing the generation of backlash.

In order to achieve the above-described object, a braking apparatus for a dual-bearing reel that is rotatably supported by a reel body includes a spool braking device (brake) for braking a spool in an electrically controllable manner, a rotational speed detection device (detector) for detecting a rotational speed of the spool, and a control device (electronic controller) that controls the spool braking device so as to brake the spool with a first braking force for a first predetermined period of time, and controls the spool braking device to brake the spool with a second braking force that is based on a change in the rotational speed after the first predetermined period of time has elapsed.

Preferably, the control device has an estimated tension calculation unit (calculator) that calculates an estimated tension value that is estimated to act on the fishing line based on the rotational speed detected by the rotational speed detection device, and calculates the estimated tension value based on the change in the rotational speed after the first predetermined period of time has elapsed, and controls the spool braking device to brake the spool with the second braking force that is based on the estimated tension value.

Preferably, the control device repeats the control of the spool braking device such that, after a prescribed period of time has elapsed after controlling the spool braking device so as to brake the spool with the second braking force, and the estimated tension value is in a first prescribed range, the spool braking device is controlled so as to brake the spool for a first prescribed period of time with the first braking force, and to brake the spool with the second braking force based on the change in the rotational speed after the first prescribed period of time has elapsed.

Preferably, the control device repeats the control of the spool braking device such that, after a prescribed period of time has elapsed after controlling the spool braking device so as to brake the spool with the second braking force, and the estimated tension value is in a first prescribed range, the spool braking device is controlled so as to brake the spool for a first prescribed period of time with the first braking force, and to brake the spool with the second braking force based on the change in the rotational speed after the first prescribed period of time has elapsed.

Preferably, the control device also comprises a casting detection unit (detector) that detects that the rotational speed detected by the rotational speed detection device has increased at a predetermined rate, and after the casting detection unit detects that the rotational speed has increased at the predetermined rate, and a second predetermined period of time has elapsed, controls the spool braking device to brake the spool with the first braking force for the first predetermined period of time.

By the present invention, it is possible to improve the precision of the braking of the spool while suppressing the generation of backlash by braking the spool with the first braking force for the first predetermined period of time and braking the spool with the second braking force that is based on the change in the rotational speed after the first predetermined period of time has elapsed.

BRIEF DESCRIPTION OF THE DRAWINGS

FIG. 6 is a view illustrating an example of a method for calculating a second braking force in a braking apparatus according to the embodiment.

DETAILED DESCRIPTION OF THE EMBODIMENTS

A braking apparatus for a dual-bearing reel according to an embodiment of the present invention will be described in detail below with reference to the drawings. Identical or equivalent portions have been assigned the same reference symbols.

In the following drawings, the positive direction of the X-axis is the front of a fishing rod to which a dual-bearing reel 1 is attached, and the negative direction of the X-axis is the rear of the fishing rod. The Y-axis direction is the axial direction of a handle shaft. The Z-axis direction is a direction that is orthogonal to the X-axis direction and to the Y-axis direction.

Figure 1:
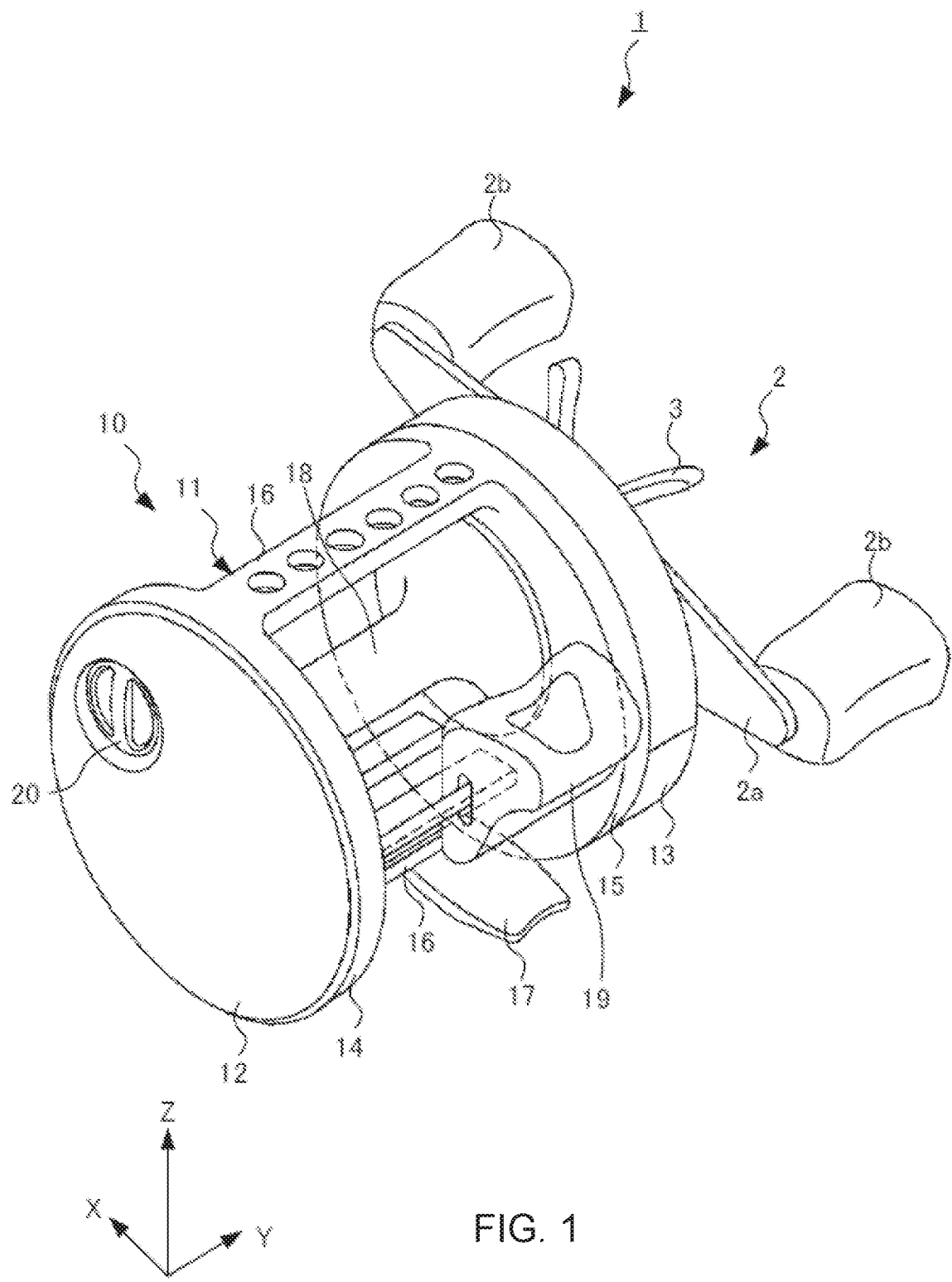
FIG. 1 is a perspective view of a dual-bearing reel according to an embodiment of the present invention.

FIG. 1 is a perspective view of the dual-bearing reel according to the embodiment of the present invention. The dual-bearing reel 1 comprises a reel body 10, a handle 2 disposed on a side of the reel body 10, and a star drag 3 for drag adjustment disposed on the reel body 10 side of the handle 2. The handle 2 comprises a plate-shaped arm portion 2a and a pair of grips 2b that are rotatably mounted on both ends of the arm portion 2a.

The reel body 10 comprises a frame 11, and a first side cover 12 and a second side cover 13 that are mounted on both sides of the frame 11. The frame 11 comprises a first side plate 14 and a second side plate 15 that face each other at an interval in the Y-axis direction, and a plurality of connecting portions 16 that connect the first side plate 14 and the second side plate 15. The frame 11 has one connecting portion 16 on the side of the positive direction of the Z-axis, as well as a pair of connecting portions 16 on the side of the negative direction of the Z-axis. The connecting portions 16 are disposed on the inner side of an outer diameter of the frame 11. In the example of FIG. 1, a rod mounting leg portion 17 is fixed to the connecting portion 16 that is positioned on the side of the negative direction of the X-axis of the pair of connecting portions 16. The dual-bearing reel 1 is attached to the fishing rod by mounting the rod mounting leg portion 17 onto the fishing rod.

The reel body 10 further comprises a spool 18, around which the fishing line is wound. The spool 18 is disposed and rotatably supported between the first side cover 12 and the second side cover 13. A clutch operating lever 19 is disposed behind the reel body 10. A clutch between the handle 2 and the spool 18 can be disengaged by operating the clutch operating lever 19.

When the clutch it disengaged by operating the clutch operating lever 19 and a cast is performed, the fishing line is unreeled and the spool 18 rotates. In order to prevent backlash during the casting operation, a braking apparatus, described further below, is disposed inside of the reel body 10. An operating knob 20 for designating an operating mode of the braking apparatus is disposed on the first side cover 12. The operating knob 20 is rotatably mounted on a spool supporting portion 21. Marks that correspond to the operating mode are formed on a portion of the first side cover 12 that surrounds the operating knob 20. A knob portion that projects outwardly is formed on an outer surface of an operating knob main body 20. One end of the knob portion points to one of the above-described marks. It is possible to designate the operating mode of the braking apparatus by the user grasping the knob portion and turning the operating knob 20. For example, the operating mode corresponding to the type of the fishing line, such as fluorocarbon, polyethylene, and nylon monofilament, is designated by turning the operating knob 20, and the braking apparatus automatically brakes the spool 18 in the designated operating mode.

Figure 2:
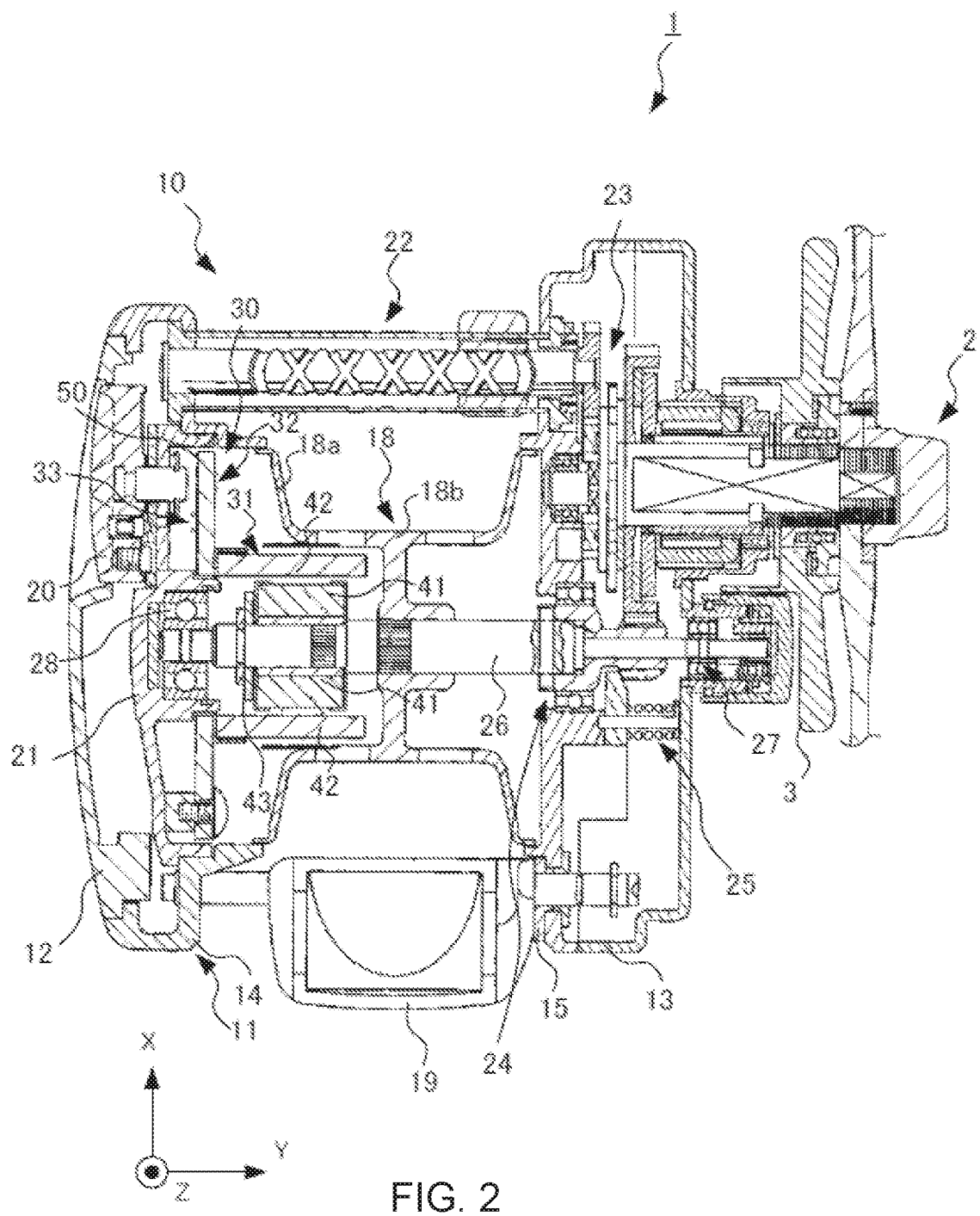
FIG. 2 is a cross-sectional view of the dual-bearing reel according to the embodiment.

FIG. 2 is a cross-sectional view of the dual-bearing reel according to the embodiment. FIG. 2 is a cross section through an XY plane. The spool supporting portion 21 is fitted into the first side cover 12. The spool 18 and a level winding mechanism 22 are disposed inside the frame 11. The level winding mechanism 22 is a mechanism for uniformly winding the fishing line around the spool 18. A gear mechanism 23, a clutch mechanism 24, and a clutch engagement and disengagement mechanism 25 are arranged between the second side plate 15 and the second side cover 13. The gear mechanism 23 transmits torque from the handle 2 to the spool 18 and the level winding mechanism 22. The clutch engagement and disengagement mechanism 25 engages and disengages the clutch mechanism 24 in accordance with the operation of the clutch operating lever 19.

The spool 18 has a pair of flange portions 18a, having cross sections that are orthogonal to the Y-axis direction and having an annular shape. The spool 18 also has, between the pair of flange portions 18a, a tubular boss portion 18b that is integrally formed with the pair of flange portions 18a. The spool 18 is fixed to a spool shaft 26 that extends through the boss portion 18b in a rotationally fixed manner, for example, by serration bonding. The spool shaft 26 extends through the second side plate 15 and extends outwardly from the second side cover 13. An end of the spool shaft 26 close to the handle 2 is rotatably supported with respect to the second side cover 13 by a shaft bearing 27. An end of the spool shaft 26 close to the first side cover 12 is rotatably supported by the spool supporting portion 21 via a shaft bearing 28.

When the handle 2 is turned, the rotation thereof is transmitted to the spool shaft 26 via the gear mechanism 23 and the clutch mechanism 24. The clutch mechanism 24 can be disengaged by operating the clutch operating lever 19.

When the clutch mechanism 24 is disengaged, the spool shaft 26 and the spool 18 can be freely rotated irrespective of the handle 2.

In order to suppress the generation of backlash during casting, the dual-bearing reel 1 comprises a braking apparatus 30 for braking the spool 18, which is rotatably supported by the reel body 10. The braking apparatus 30 comprises a spool braking device (spool brake) 31 for braking the spool 18, a rotational speed detection device (rotational speed detector) 32 for detecting the rotational speed of the spool 18, and a mode detection unit (mode detector) 33 that detects an operating mode that is indicated by the operating knob 20. The braking apparatus 30 further comprises a control device (electronic controller), which is shown schematically in FIG. 4. The control device is mounted on a circuit board 50, which is provided farther on the side of the first side plate 14 than the spool 18, and controls the spool braking device 31. The spool braking device 31 can be electrically controlled. Specifically, the spool braking device 31 has at least one magnet 41 that is integrally rotatable with the spool shaft 26, and a plurality of coils 42 that are connected in series. The spool braking device 31 brakes the spool 18 by power generation.

Figure 3:
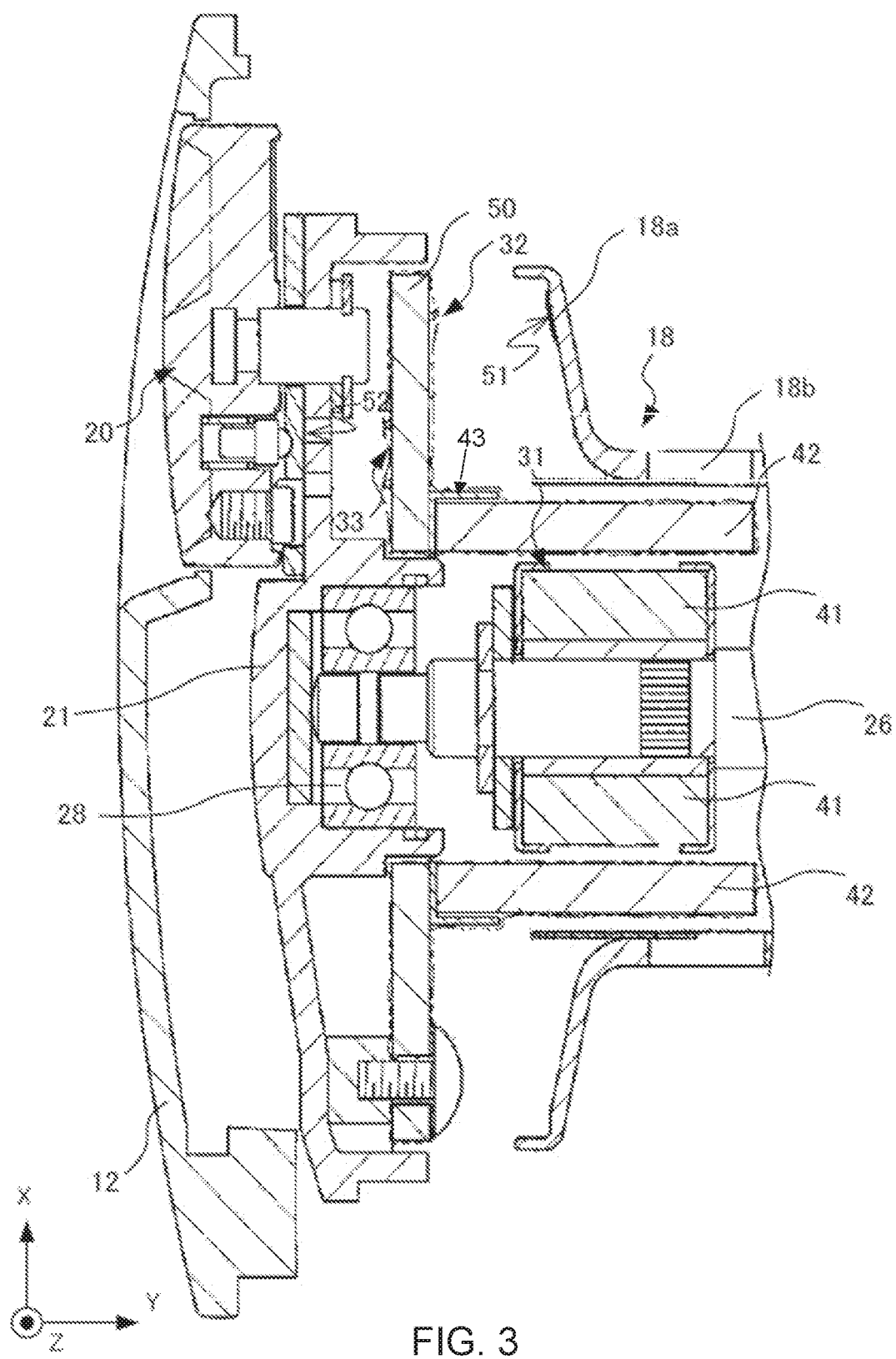
FIG. 3 is an enlarged cross-sectional view of the dual-bearing reel according to the embodiment.

FIG. 3 is an enlarged cross-sectional view of the dual-bearing reel according to the embodiment. The spool braking device 31 is disposed on the side of the first side plate 14 of the spool shaft 26. At least one magnet 41 is attached to the spool shaft 26 so as to be integrally rotatable. For example, the magnets 41 are cylindrical magnets that are magnetized to be polar anisotropic and have a plurality of magnetic poles arranged in the rotational direction of the spool 18, and are fixed to the spool shaft 26 by adhesion.

A plurality of the coils 42, for example, four of the coils 42, are arranged on the outer side of the magnets 41 in the radial direction, opposing the magnets 41 with a space therebetween, and are attached to the circuit board 50 by a coil attaching member 43. Specifically, the plurality of coils 42 are formed curved in an arc shape and are arranged in the circumferential direction with respect to Y-axis at intervals, thereby being formed, overall, in the form of a tube, the central axis of which is parallel to the Y-axis. The plurality of coils 42 are of a coreless type, in order to prevent cogging and to make the rotation of the spool 18 smooth. Each of the plurality of coils 42 is wound in an essentially rectangular shape, such that the wound core wire is disposed inside the magnetic field of the magnets 41, facing the magnets 41. The plurality of coils 42 are attached to the circuit board 50.

The rotational speed detection device 32 detects the rotational speed of the spool 18. For example, the rotational speed detection device 32 is a reflective photoelectric switch that has a light-emitting part and a light-receiving part, and is disposed on a surface of the circuit board 50 that opposes the flange portion 18a of the spool 18. A pattern to be read 51, which reflects light that is irradiated from the light-emitting part, is formed on a surface of the flange portion 18a on the side of the negative direction of the Z-axis. For example, the pattern to be read 51 is formed by printing, application of an adhesive strip, attachment of a reflective plate, etc. The light-receiving part reads the light that is irradiated from the light-emitting part and reflected by the pattern to be read 51. With the configuration described above, the rotational speed detection device 32 detects the rotational speed.

The mode detection unit 33 detects the operating mode that is indicated by the operating knob 20. For example, the mode detection unit 33 is a reflective photoelectric switch that has a light-emitting part and a light-receiving part, and is disposed on a surface of the circuit board 50 that opposes the spool supporting portion 21. An identification pattern 52, which reflects the light that is irradiated from the light-emitting part, is formed on a surface of the spool supporting portion 21 on the side of the negative direction of the Y-axis. Specifically, the identification pattern 52 is formed on the surface of the spool supporting portion 21 on the side of the negative direction of the Y-axis, at a position that is symmetrical to the marks formed on the first side cover 12 with respect to the XZ plane. For example, the identification pattern 52 is formed by printing, application of an adhesive strip, attachment of a reflective plate, or the like. The light-receiving part reads the light that is irradiated from the light-emitting part and reflected by the identification pattern 52. With the configuration described above, the mode detection unit 33 detects the operating mode that is indicated by the operating knob 20, which is rotated in accordance with an operation by a user.

Figure 4:
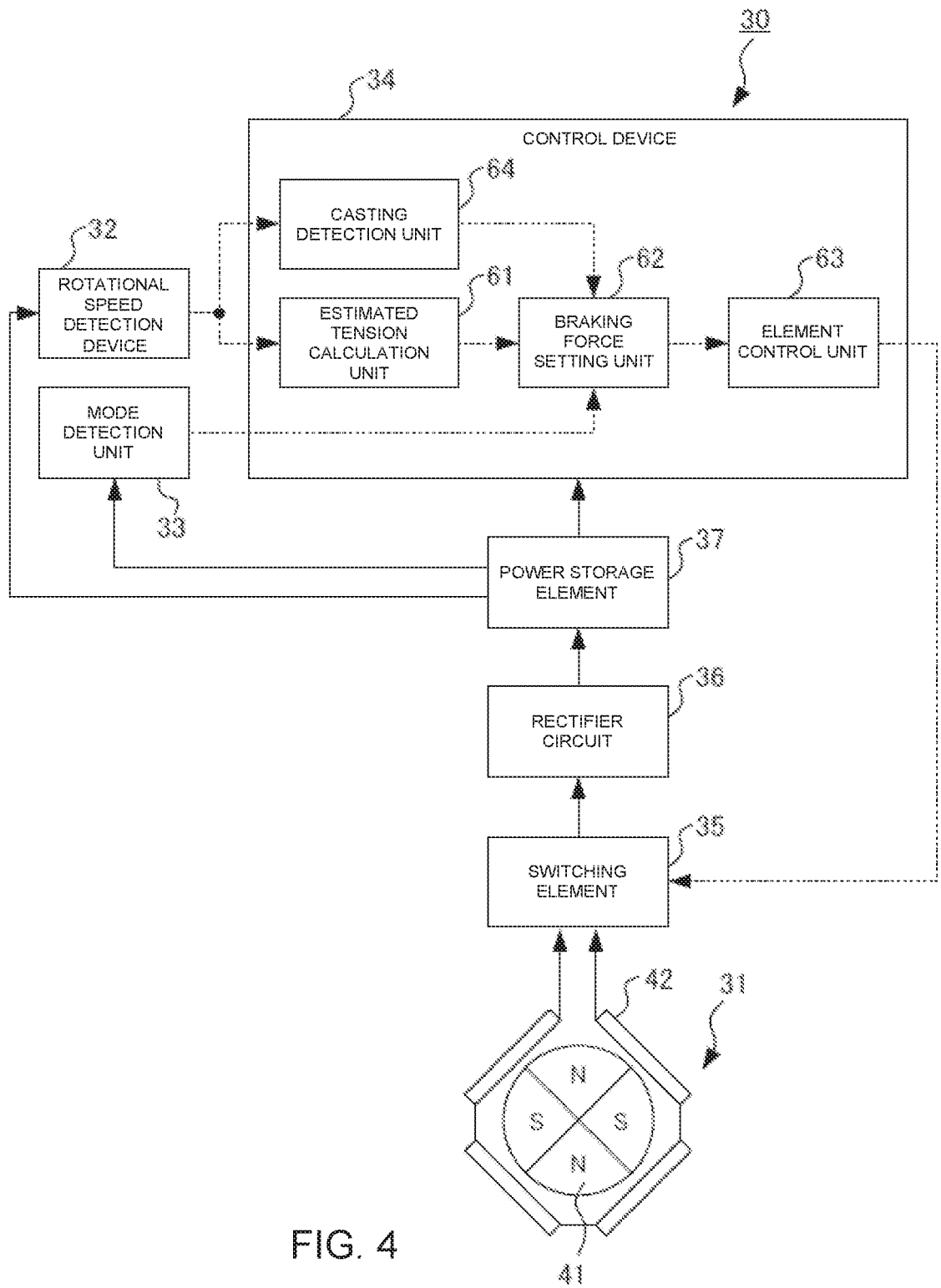
FIG. 4 is a block view illustrating a configuration of a braking apparatus for a dual-bearing reel according to the embodiment.

The above-described control device controls the spool braking device 31 to brake the spool 18 in accordance with the rotational speed that is detected by the rotational speed detection device 32 and the mode that is detected by the mode detection unit 33. FIG. 4 is a block view illustrating the configuration of the braking apparatus according to the embodiment. The braking apparatus 30 comprises the spool braking device 31, the rotational speed detection device 32, the mode detection unit 33, and a control device (electronic controller) 34 that controls the spool braking device 31.

The braking apparatus 30 further comprises a switching element (switch) 35, a rectifier circuit 36, and a power storage element (power storage) 37. Two ends of the plurality of coils 42 that are connected in series are electrically connected to the switching element 35. An electric current is generated due to a relative rotation between the coils 42 and the magnets 41 of the spool braking device 31 at the time of casting. The electric current that is generated due to the relative rotation between the coils 42 and the magnets 41 passes through the switching element 35 and the rectifier circuit 36 and flows to the power storage element 37. The rectifier circuit 36 rectifies the current that is generated at the time of casting, and outputs the current to the power storage element 37. Electric power that is generated at the time of casting is stored in the power storage element 37. The power storage element 37 functions as a power source that supplies electric power to the rotational speed detection device 32, the mode detection unit 33, and the control device 34. The power storage element 37 is, for example, an electrolytic capacitor. The control device 34 controls the ON/OFF of the switching element 35. It is possible to control the spool braking device 31 by controlling a duty ratio of the switching element 35 with the control device 34. When the ON time of the switching element 35 becomes longer, that is, when the duty ratio becomes higher, the braking force that is generated in the spool braking device 31 increases.

The braking apparatus 30 further comprises the circuit board 50, which has an annular shape and whose central axis is parallel to the Y-axis. The circuit board 50 is attached to the spool supporting portion 21 such that a main surface of the circuit board 50 is oriented facing the flange portion 18a of the spool 18. Although not shown in FIG. 3, the control device 34, the switching element 35, the rectifier circuit 36, and the power storage element 37 are mounted on the circuit board 50.

The operation of the control device 34 will be described. The control device 34 controls the spool braking device 31 to brake the spool 18 with a first braking force for a first predetermined period of time. In addition, the control device 34 controls the spool braking device 31 to brake the spool 18 with a second braking force that is based on a change in the rotational speed after the first predetermined period of time has elapsed.

Specifically, the control device 34 has an estimated tension calculation unit (estimated tension calculator) 61 that calculates an estimated tension value that is estimated to act on the fishing line based on the rotational speed detected by the rotational speed detection device 32, and a braking force setting unit (braking force setter) 62 that sets a target value of the braking force that the spool braking device 31 generates. The control device 34 further comprises an element control unit (controller) 63 that calculates the duty ratio of the switching element 35 in accordance with the target value of the braking force that is set by the braking force setting unit 62 and controls the switching element 35 in accordance with the calculated duty ratio.

The method for calculating the estimated tension value will be described. If the rotational speed detected by the rotational speed detection device 32 is ω, the estimated tension value F can be calculated from the rate of change of the rotational speed of the spool 18 (Δω/Δt) and the moment of inertia J of the spool 18. If the rotational speed of the spool 18 changes, relative to when the spool 18 is freely rotates independently, at a certain point in time during casting, this difference in rotational speed will be caused by a rotational torque that is generated due to the tension from the fishing line. The rotational torque T is expressed by the following formula (1). The estimated tension value F can be calculated from the rotational torque T obtained from the following formula (1) and a radius of a point of operation of the fishing line.

$$T = J \times (\Delta\omega/\Delta t) \quad (1)$$

Figure 5:
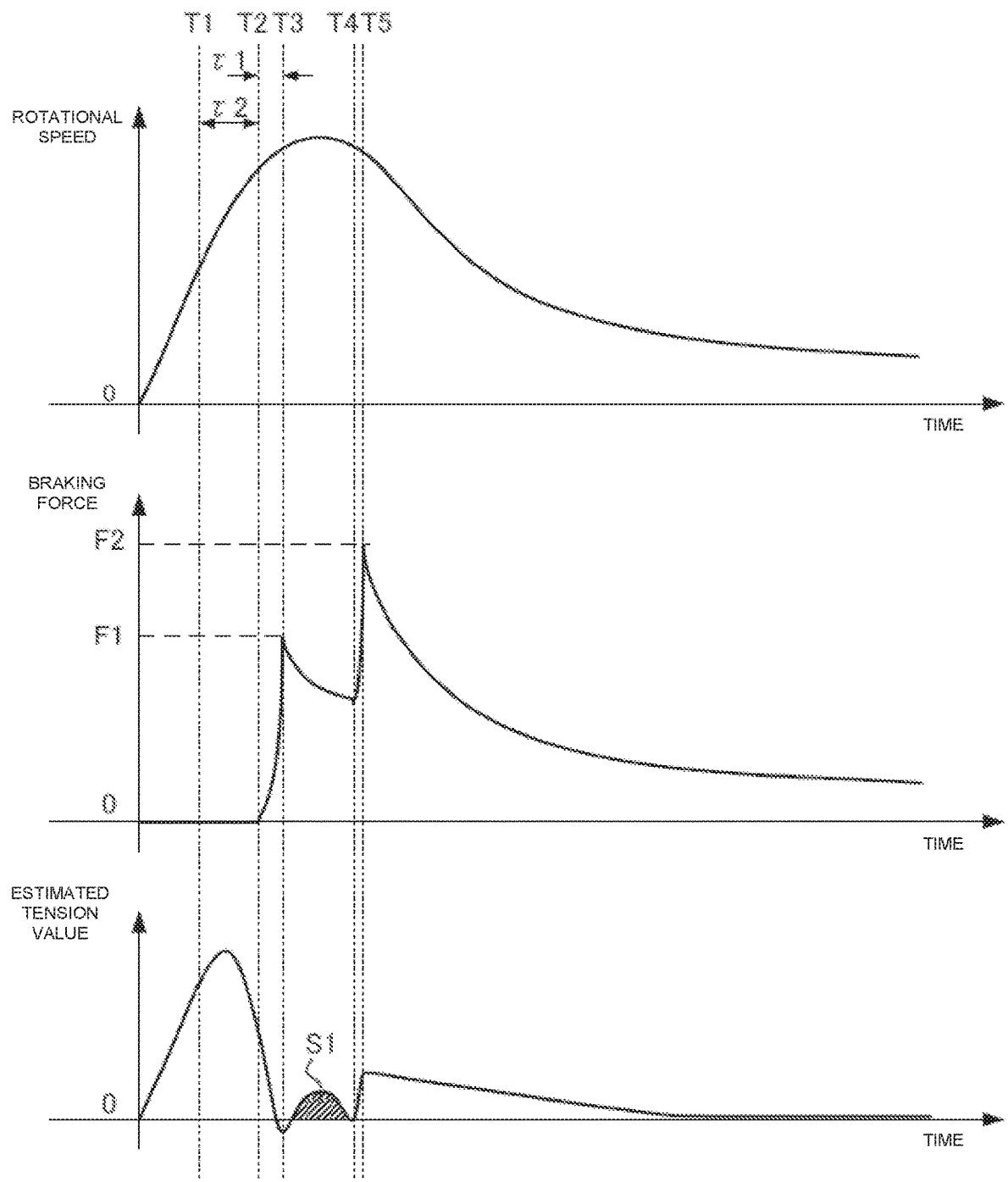
FIG. 5 is a view illustrating one example of braking of a spool according to the embodiment.

The operation of braking the spool 18 at the time of casting will be described in detail. FIG. 5 is a view illustrating one example of the braking of the spool according to the embodiment. The upper part of FIG. 5 is a view illustrating the change in the rotational speed at the time of casting. The middle part of FIG. 5 is a view illustrating the change in the braking force that is generated by the spool braking device 31 at the time of casting. The lower part of FIG. 5 is a view illustrating the change in the estimated tension value at the time of casting. Each horizontal axis in FIG. 5 represents time. As shown in the upper part of FIG. 5, the rotational speed detection device 32 detects the rotational speed of the spool 18. The spool braking device 31 brakes the spool 18 in an electrically controllable manner by generating the braking force shown in the middle part of FIG. 5. As shown in the middle part of FIG. 5, the control device 34 controls the spool braking device 31 to brake the spool 18 with a first braking force F1 for a first predetermined period of time τ1, and controls the spool braking device 31 to brake the spool 18 with a second braking force F2 that is based on the change in the rotational speed after the first predetermined period of time τ1 has elapsed. Specifically, the control device 34 controls the spool braking device 31 to brake the spool 18 with the second braking force F2 that is based on the estimated tension value, which is calculated by the estimated tension calculation unit 61 based on the change in the rotational speed after the first predetermined period of time τ1 has elapsed.

The control device 34 also comprises a casting detection unit (casting detector) 64 that detects that the rotational speed detected by the rotational speed detection device 32 has increased at a predetermined rate. In the example of FIG. 5, the casting detection unit 64 detects that the rotational speed has increased at the predetermined rate at time T1. The predetermined rate is the rate of change of the rotational speed at which it is reasonable to assume that casting has been initiated. The control device 34 controls the spool braking device 31 to brake the spool 18 with the first braking force F1, after a second predetermined period of time τ2 has elapsed after the casting detection unit 64 detects that the rotational speed has increased at the predetermined rate. The second predetermined period of time τ2 is a period of time that is shorter than the period of time from the start of casting to the point in time at which the rate of change of the rotational speed switches to a negative value. For example, the second predetermined period of time τ2 is a fixed value based on a simulation, test, etc., or a value corresponding to the rotational speed immediately after the start of casting. The braking force setting unit 62 sets the target value of the braking force to be generated by the spool braking device 31 to the first braking force F1 at time T2. The first braking force F1 is a fixed value based on a simulation, test, etc., or a value corresponding to the rotational speed immediately after the start of casting.

The braking force setting unit 62 maintains the target value of the braking force at the first braking force F1 for the first predetermined period of time τ1, from time T2 to time T3. The element control unit 63 calculates the duty ratio corresponding to the first braking force F1 and controls the switching element 35 in accordance with the calculated duty ratio. Specifically, the element control unit 63 has, for example, a first-order lag filter, and increases the duty ratio in a stepwise manner until the duty ratio reaches a value corresponding to the first braking force F1. With the configuration described above, the control device 34 controls the spool braking device 31 to brake the spool 18 with the first braking force F1 for the first predetermined period of time τ1. That is, the control device 34 controls the spool braking device 31 for the first predetermined period of time τ1 such that the braking force becomes the target first braking force F1. In the example of FIG. 5, the first predetermined period of time τ1 is included in a period during which the rotational speed detected by the rotational speed detection device 32 increases. For example, the length of the first predetermined period of time τ1 is 0.1 seconds.

When a process to control the spool braking device 31 to brake the spool 18 with the first braking force F1 ends at time T3, the control device 34 controls the spool braking device 31 such that the braking force decreases in a stepwise manner. Specifically, after time T3, the element control unit 63 decreases the duty ratio in a stepwise manner. As a result, in the example of FIG. 5, the braking force that is generated by the spool braking device 31 decreases from time T3 to time T4. The way in which the braking force changes between times T3 and T4 depends on the conditions of flight of the lure, for example, the weight of the lure, whether there is a tailwind or headwind, etc.

As described above, after controlling the spool braking device 31 to brake the spool 18 with the first braking force F1 only for the first predetermined period of time τ1, the control device 34 determines the situation in which the dual-bearing reel 1 is being used from the subsequent change in the rotational speed and calculates the second braking force F2 based on the situation. In the example of FIG. 5, the change in the rotational speed corresponds to an area S1 of the hatched portion. In addition, the situation can include, for example, the lure and the fishing line being used, the presence of a tailwind or headwind, etc. The control device 34 controls the spool braking device 31 to brake the spool 18 with the second braking force F2, which is the braking force that is suited to the situation.

In the example of FIG. 5, at time T4 after a set period of time has elapsed since time T3, which is when the first predetermined period of time τ1 has elapsed, the braking force setting unit 62 sets the target value of the braking force to the second braking force F2, which is based on the change in the rotational speed after time T3. Specifically, the braking force setting unit 62 calculates the second braking force F2 based on the estimated tension value corresponding to the change in the rotational speed during the set period of time described above, that is, during the time after time T3, and sets the target value of the braking force to the calculated second braking force F2. For example, the braking force setting unit 62 calculates the second braking force F2 based on the operating mode as well as on an integrated value of the estimated tension values that are greater than or equal to a first threshold value, between time T3 to time T4. The first threshold value is, for example, zero, and, in the example of FIG. 5, the braking force setting unit 62 calculates the second braking force based on the operating mode as well as on the area of the hatched portion of FIG. 5. The period of time from time T3 to time T4 is, for example, 0.3 seconds.

FIG. 6 is a view illustrating an example of the method for calculating the second braking force in the braking apparatus according to the embodiment. The braking force setting unit 62 contains a table for calculating the second braking force from the operating modes FL, PE, NM and ranges R1, R2, R3, which are ranges of values that the integrated value of the estimated tension values described above can assume. In the example of FIG. 6, the operating modes are FL, which indicates fluorocarbon, PE, which indicates polyethylene, and NM, which indicates nylon monofilament. For example, when the integrated value of the estimated tension values is a value included in range R1 and the operating mode is FL, the braking force setting unit 62 calculates the second braking force F2 as f1.

The braking force setting unit 62 sets the target value of the braking force to the second braking force F2 from time T4 to time T5. The element control unit 63 calculates the duty ratio corresponding to the second braking force F2 and controls the switching element 35 in accordance with the calculated duty ratio. Specifically, the element control unit 63 increases the duty ratio in a stepwise manner until the duty ratio reaches a value corresponding to the second braking force F2. With the configuration described above, the control device 34 controls the spool braking device 31 with the second braking force F2 from time T4 to time T5. That is, the control device 34 controls the spool braking device 31 from time T4 to time T5 such that the braking force becomes the target second braking force F2. The period of time from time T4 to time T5 is, for example, 0.1 seconds.

When the process to control the spool braking device 31 to brake the spool 18 with the second braking force F2 ends at time T5, the control device 34 controls the spool braking device 31 such that the braking force decreases in a stepwise manner. Specifically, after time T5, the element control unit 63 decreases the duty ratio in a stepwise manner. As a result, in the example of FIG. 6, the braking force that is generated by the spool braking device 31 decreases after time T5. The manner in which the braking force changes after time T5 depends on the flight situation of the lure.

MODIFIED EXAMPLE 1

Figure 7:
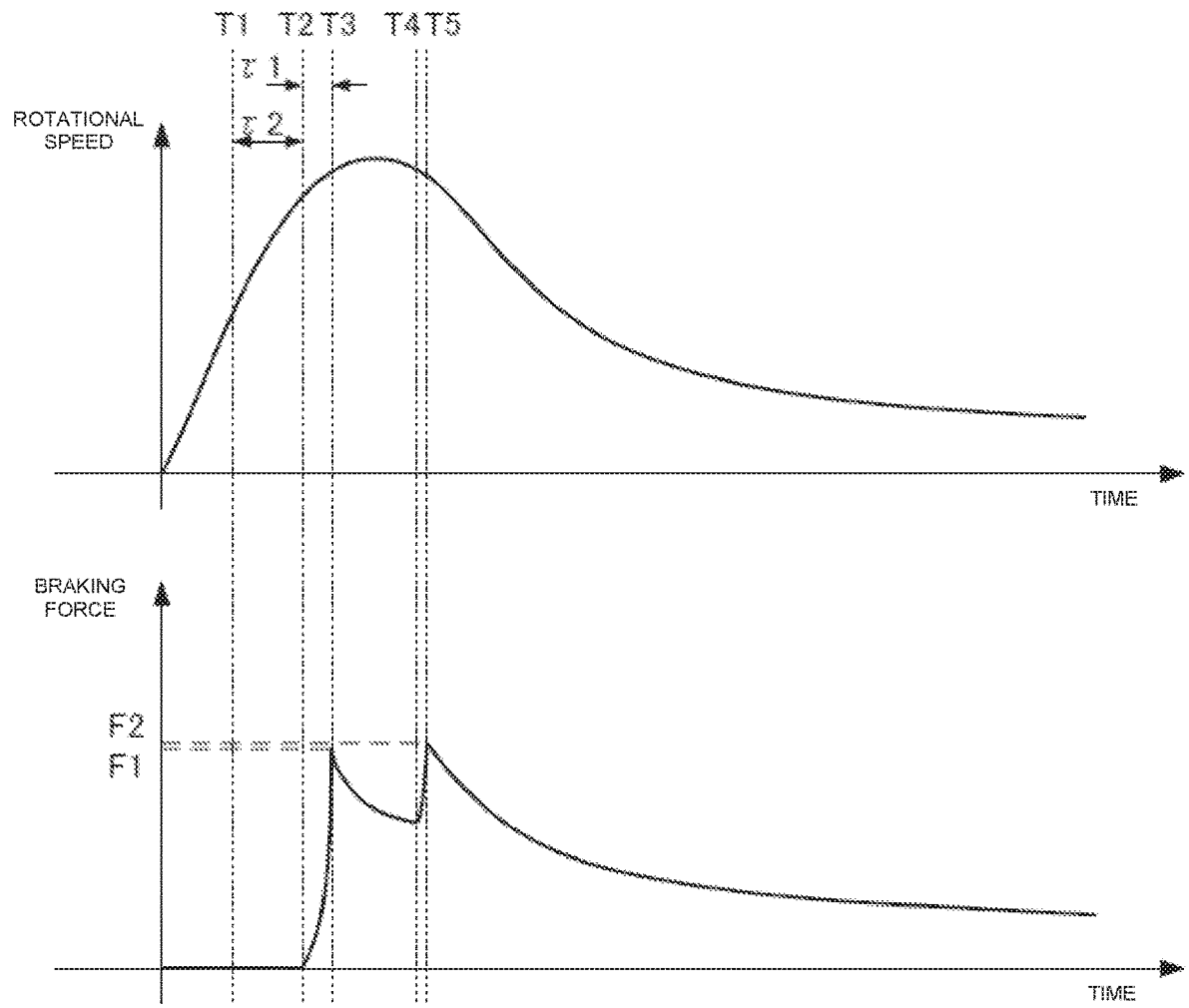
FIG. 7 is a view illustrating a first modified example of the braking of the spool according to the embodiment.

The method for braking the spool 18 is not limited to the example described above. FIG. 7 is a view illustrating a first modified example of the braking of the spool according to the embodiment. In the example of FIG. 7, the magnitude of the first braking force F1 and the magnitude of the second braking force F2 can be equivalent.

MODIFIED EXAMPLE 2

Figure 8:
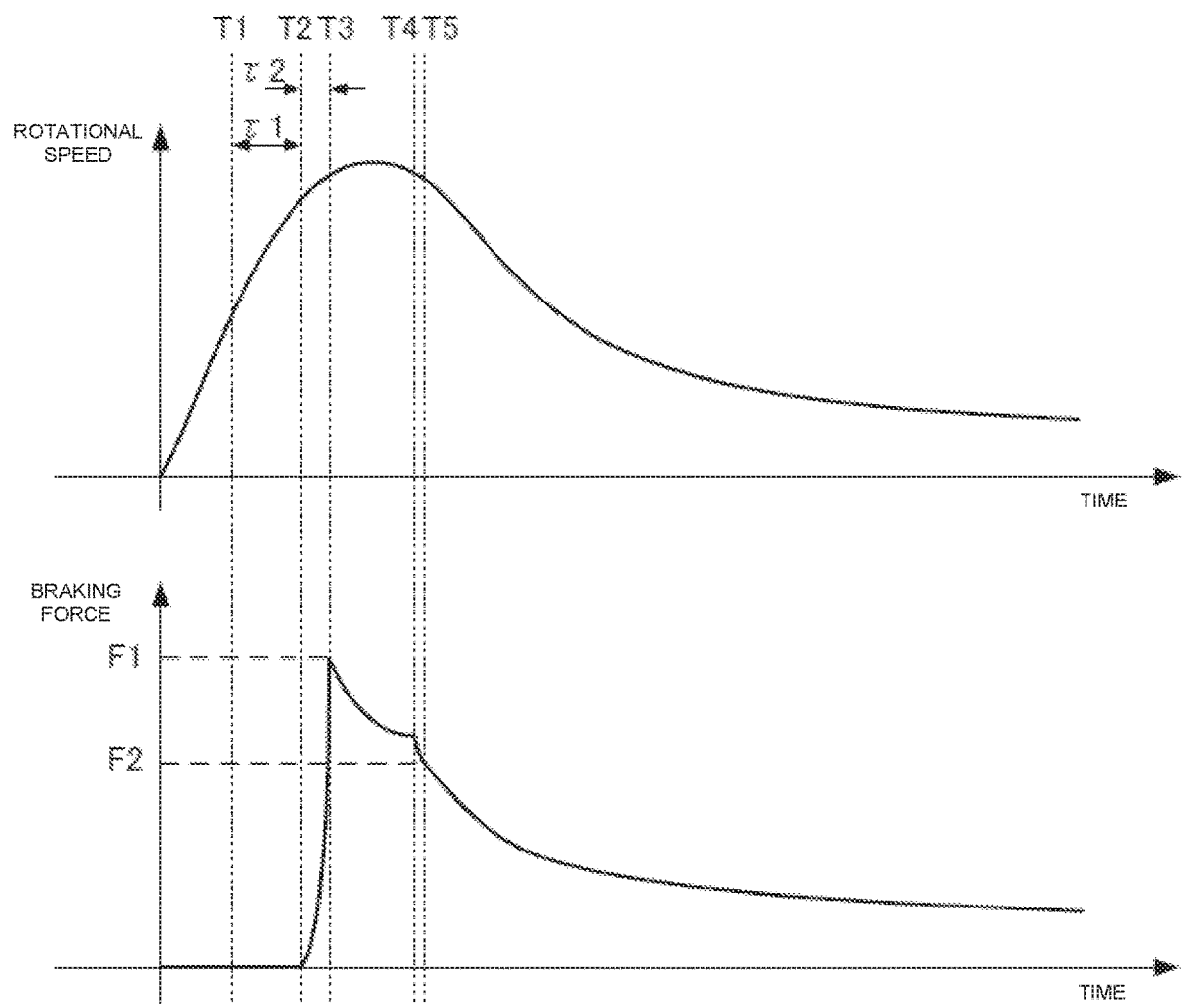
FIG. 8 is a view illustrating a second modified example the braking of the spool according to the embodiment.

FIG. 8 is a view illustrating a second modified example the braking of the spool according to the embodiment. In the example of FIG. 8, the first braking force F1 is greater than the second braking force F2. In the example of FIG. 8, the braking apparatus 30 brakes the spool 18 with the second braking force F2, which is smaller than the first braking force F1, after braking the spool 18 with the first braking force F1. Since the spool 18 is first braked by the first braking force F1, which is a sufficiently large braking force, it is possible to suppress the generation of backlash.

MODIFIED EXAMPLE 3

In the example described above, braking with the first braking force F1 and braking with the second braking force F2 were each carried out once; however, braking with the first braking force F1 and braking with the second braking force F2 may be carried out a plurality of times. An example in which braking with the first braking force F1 and braking with the second braking force F2 are carried out a plurality of times will be described.

After a third predetermined period of time has elapsed after controlling the spool braking device 31 to brake the spool 18 with the second braking force F2, the control device 34 determines whether or not there is a need for additional braking based on the estimated tension value that is calculated by the estimated tension calculation unit 61. If it is determined that additional braking is unnecessary, the operation of the braking apparatus 30 is the same as the embodiment described above. If it is determined that additional braking is necessary, the braking apparatus 30 carries out additional braking. Specifically, when the estimated tension value is in a first predetermined range, the control device 34 repeats the control of the spool braking device 31 to brake the spool 18 with the first braking force for the first predetermined period of time, and the control of the spool braking device 31 to brake the spool 18 with the second braking force. In practice, because there is a large dependence upon, for example, the flight situation of the lure, the weight of the lure, the presence of a tailwind or headwind, etc., when the estimated tension value is in the first predetermined range, the spool 18 can be considered to be insufficiently braked. The first predetermined range is set based on an actual machine test, simulation, etc.

Figure 9:
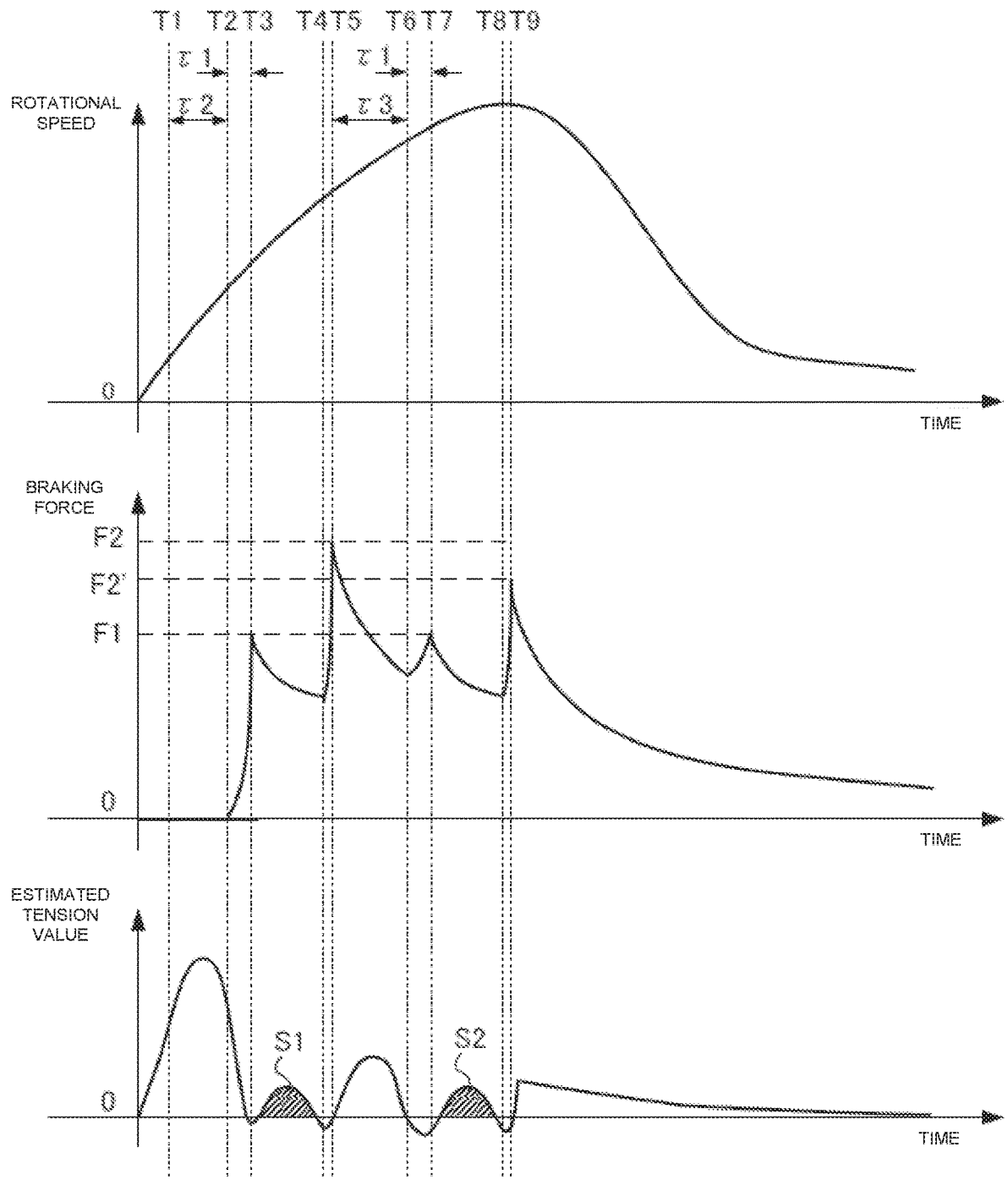
FIG. 9 is a view illustrating a third modified example the braking of the spool according to the embodiment.

FIG. 9 is a view illustrating a third modified example of braking of the spool according to the embodiment. The figure should be regarded in the same manner as FIG. 5. The third modified example of braking of the spool 18 will be described with reference to FIG. 9. A situation in which the estimated tension value is thought to be within the first predetermined range at time T6 after a predetermined period of time τ3 has elapsed after the control from time T5, and additional braking is carried out after time T6, will be described as an example. The changes in the rotational speed, the braking force, and the estimated tension value up to time T5 are the same as those in the example of FIG. 5. Since the estimated tension value is within the first predetermined range at time T6, the control device 34 controls the spool braking device 31 to brake the spool 18 with the first braking force F1 for the first predetermined period of time τ1 from time T6 to time T7. Specifically, since the estimated tension value is within the first predetermined range at time T6, the braking force setting unit 62 sets the target value of the braking force to be generated by the spool braking device 31 to the first braking force F1. The braking force setting unit 62 maintains the target value of the braking force at the first braking force F1 for the first predetermined period of time τ1, from time T6 to time T7, in the same manner as in the example of FIG. 5. The element control unit 63 continuously increases the duty ratio until the duty ratio reaches a value corresponding to the first braking force F1, in the same manner as in the example of FIG. 5. With the configuration described above, the control device 34 can control the spool braking device 31 to brake the spool 18 with the first braking force F1 for the first predetermined period of time τ1 from time T6 to time T7.

When the process to control the spool braking device 31 to brake the spool 18 with the first braking force F1 ends at time T7, the control device 34 controls the spool braking device 31 such that the braking force continuously decreases. Specifically, after time T7, the element control unit 63 continuously decreases the duty ratio. As a result, in the example of FIG. 9, the braking force that is generated by the spool braking device 31 decreases after time T7. The manner in which the braking force changes after time T7 depends on the flight situation of the lure.

Thereafter, the control device 34 determines the situation in which the dual-bearing reel 1 is being used from the change in the rotational speed after time T7 and calculates a second braking force F2'based on the situation. In the example of FIG. 9, the change in the rotational speed corresponds to an area S2 of the hatched portion. The control device 34 controls the spool braking device 31 to brake the spool 18 with the second braking force F2', which is the braking force that is suited to the situation. In the example of FIG. 9, at time T8, after a set period of time has elapsed since time T7, the braking force setting unit 62 sets the target value of the braking force to the second braking force F2', which is based on the change in the rotational speed after time T7. Specifically, the braking force setting unit 62 calculates the second braking force F2'based on the estimated tension value corresponding to the change in the rotational speed after time T7, and sets the target value of the braking force to the calculated second braking force F2', in the same manner as in the example of FIG. 5. The period of time from time T7 to time T8 is, for example, 0.3 seconds.

The braking force setting unit 62 sets the target value of the braking force to the second braking force F2'from time T8 to time T9. The element control unit 63 calculates the duty ratio corresponding to the second braking force F2'and controls the switching element 35 in accordance with the calculated duty ratio. Specifically, the element control unit 63 continuously increases the duty ratio until the duty ratio reaches a value corresponding to the second braking force F2'. With the configuration described above, the control device 34 controls the spool braking device 31 with the second braking force F2'from time T8 to time T9. That is, the control device 34 controls the spool braking device 31 from time T8 to time T9 such that the braking force becomes the target second braking force FT. The period of time from time T8 to time T9 is, for example, 0.1 seconds.

When the process to control the spool braking device 31 to brake the spool 18 with the second braking force F2'ends at time T9, the control device 34 controls the spool braking device 31 so that the braking force continuously decreases. Specifically, after time T9, the element control unit 63 continuously decreases the duty ratio. As a result, in the example of FIG. 9, the braking force that is generated by the spool braking device 31 decreases after time T9. The manner in which the braking force changes after time T9 depends on the flight situation of the lure.

As described above, it is possible to prevent a lack of braking force by repeating braking with the first braking force and braking with the second braking force. In the example above, the first braking force in the first braking and the first braking force in the additional braking may be the same or different values as those used in the examples above.

MODIFIED EXAMPLE 4

Figure 10:
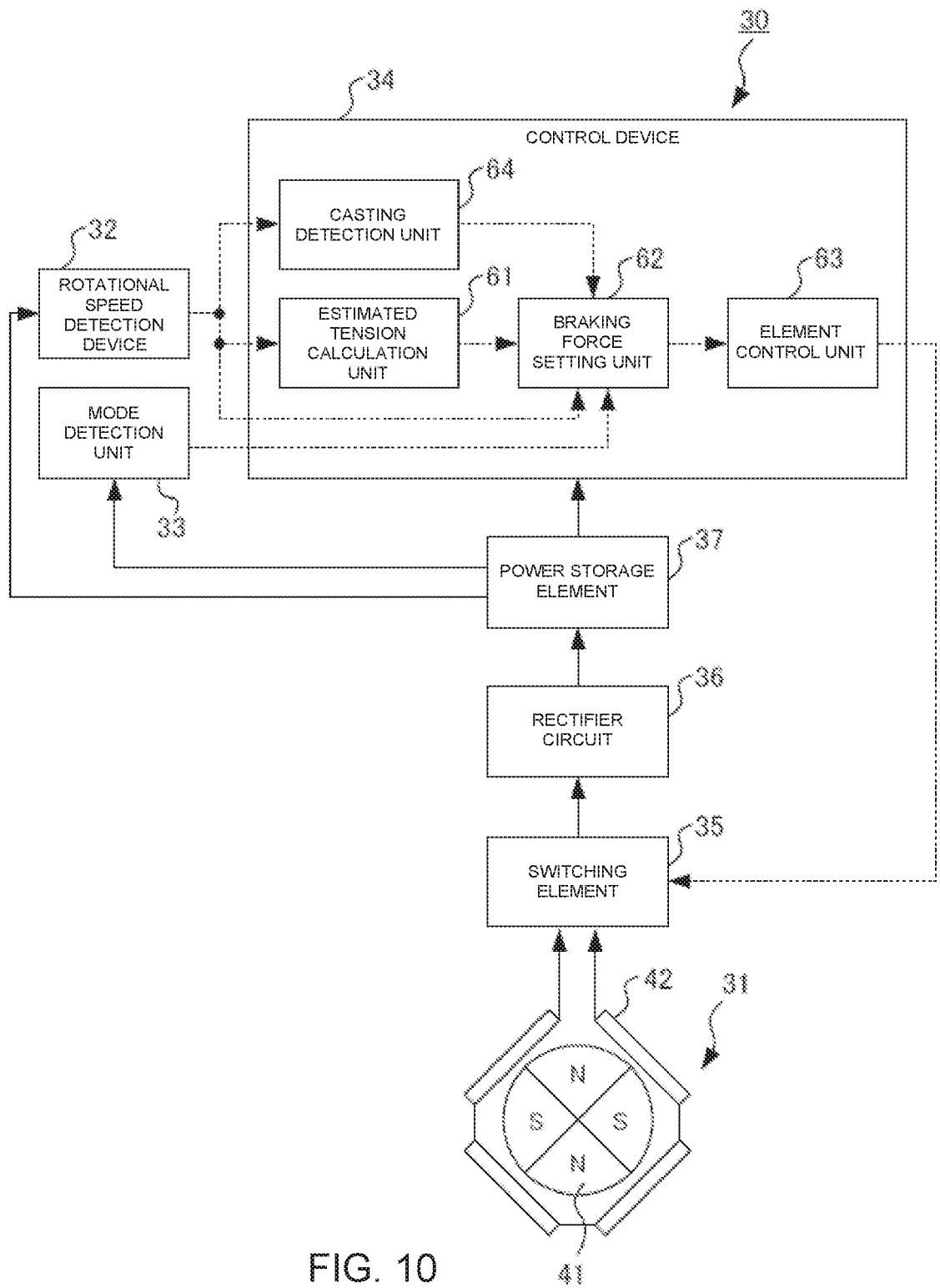
FIG. 10 is a block view illustrating a configuration of a modified example of the braking apparatus for a dual-bearing reel according to the embodiment.

The method for determining if there is the need for additional braking is not limited to the example described above. An example in which it is determined whether or not there is a need for additional braking based on the rotational speed that is detected by the rotational speed detection device 32 will be described. FIG. 10 is a block view illustrating a configuration of a fourth modified example of the braking apparatus for a dual-bearing reel according to the embodiment. In the fourth modified example, the braking force setting unit 62 aquires the rotational speed from the rotational speed detection device 32. The other configurations of the braking apparatus 30 are the same as those in FIG. 4.

After the third predetermined period of time has elapsed after controlling the spool braking device 31 to brake the spool 18 with the second braking force F2, the control device 34 determines whether there is a need for additional braking based on the rotational speed that is detected by the rotational speed detection device 32. If it is determined that additional braking is unnecessary, the operation of the braking apparatus 30 is the same as the embodiment described above. If it is determined that additional braking is necessary, the braking apparatus 30 carries out additional braking. Specifically, when the rotational speed is in a second predetermined range, the control device 34 repeats the control of the spool braking device 31 to brake the spool 18 with the first braking force for the first predetermined period of time and the control of the spool braking device 31 to brake the spool 18 with the second braking force. When the rotational speed is in the second predetermined range, the spool 18 can be considered to be insufficiently braked. The second predetermined range is set based on an actual machine test, simulation, etc.

The example of braking the spool 18 in the fourth modified example is the same as the example of braking the spool 18 in the third modified example shown in FIG. 9. However, in the fourth modified example, the rotational speed is thought to be within the second predetermined range at time T6, and additional braking is carried out after time T6.

As described above, the braking apparatus 30 of the present embodiment enables improvement of the precision of the braking of the spool 18 while suppressing the generation of backlash by braking the spool 18 with the first braking force for the first predetermined period of time, and ascertaining conditions such as the lure and the fishing line that are being used, whether there is a tailwind or headwind, etc., by detecting the change in the rotational speed after the first predetermined period of time has elapsed, and braking the spool 18 with the second braking force that is based thereon. If the precision of the braking of the spool 18 can be improved, the braking force will not be excessive during the latter half of the casting, and it is possible to extend the flight distance. In addition, because the spool 18 is braked by the second braking force that is based on the change in the rotational speed, it is possible to brake the spool 18 in accordance with the change in the rotational speed that is caused by the change in the amount of the line. That is, because the spool 18 is braked by the braking force that corresponds to the amount of the line, neither excessive nor a deficient braking force is employed.

The embodiment of the present invention is not limited to the embodiment described above. The braking force setting unit 62 may calculate the second braking force F2 based on the average value, the median value, etc., of the estimated tension values that are greater than or equal to the first threshold value after the first predetermined period of time τ1 has elapsed. In addition, the braking force setting unit 62 may contain a function for calculating the second braking force F2 from the estimated tension value after the first predetermined period of time τ1 has elapsed. In this case, the braking force setting unit 62 calculates the second braking force F2 from the estimated tension value and the function after the first predetermined period of time has elapsed. The control device 34 can control the spool braking device 31 to brake the spool 18 with the first braking force for the first predetermined period of time τ1 from the point in time at which the rate of change of the rotational speed falls below a second threshold value. The braking force setting unit 62 can calculate the second braking force F2 based on the estimated tension value during a set period of time immediately after the first predetermined period of time τ1 has elapsed, or may calculate the second braking force F2 based on the estimated tension value during a set period of time from the point in time at which more time has elapsed after the first predetermined period of time τ1 has elapsed.

What is claimed is:

1. A braking apparatus for a spool that is rotatably supported by a reel body, comprising:
    a spool braking device configured to brake a spool in an electrically controllable manner;
    a rotational speed detector configured to detect a rotational speed of the spool; and
    an electronic controller configured to control the spool braking device to brake the spool with a first braking force for a first predetermined period of time, and control the spool braking device to brake the spool with a second braking force that is based on a change in the rotational speed after the first predetermined period of time has elapsed.

2. The braking apparatus recited in claim 1, wherein
the electronic controller has an estimated tension calculator configured to calculate an estimated tension value acting on the fishing line based on the rotational speed detected by the rotational speed detector, and
the electronic controller is configured to calculate the estimated tension value based on the change in the rotational speed after the first predetermined period of time has elapsed, and control the spool braking device to brake the spool with the second braking force based on the estimated tension value.

3. The braking apparatus recited in claim 2, wherein
the electronic controller is configured to repeat control of the spool braking device such that, after a prescribed period of time has elapsed after controlling the spool braking device so as to brake the spool with the second braking force, and the estimated tension value is in a first prescribed range, the spool braking device is controlled so as to brake the spool for a first prescribed period of time with the first braking force, and to brake the spool with the second braking force based on the change in the rotational speed after the first prescribed period of time has elapsed.

4. The braking apparatus recited in claim 2, wherein
the electronic controller is configured to repeat control of the spool braking device such that, after a prescribed period of time has elapsed after controlling the spool braking device so as to brake the spool with the second braking force, and the estimated tension value is in a first prescribed range, the spool braking device is controlled so as to brake the spool for a first prescribed period of time with the first braking force, and to brake the spool with the second braking force based on the change in the rotational speed after the first prescribed period of time has elapsed.

5. The braking apparatus recited in claim 1, wherein
the electronic controller further comprises a casting detector configured to detect that the rotational speed detected by the rotational speed detector has increased at a predetermined rate, and
after the casting detector has detected that the rotational speed has increased at the predetermined rate, and a second predetermined period of time has elapsed, the electronic controller is configured to control the spool braking device to brake the spool with the first braking force for the first predetermined period of time.

* * * * *